No. 639,074. Patented Dec. 12, 1899.
S. P. MACKEY.
WEIGHING AND MEASURING MACHINE.
(Application filed Oct. 8, 1898.)
(No Model.) 2 Sheets—Sheet 1.
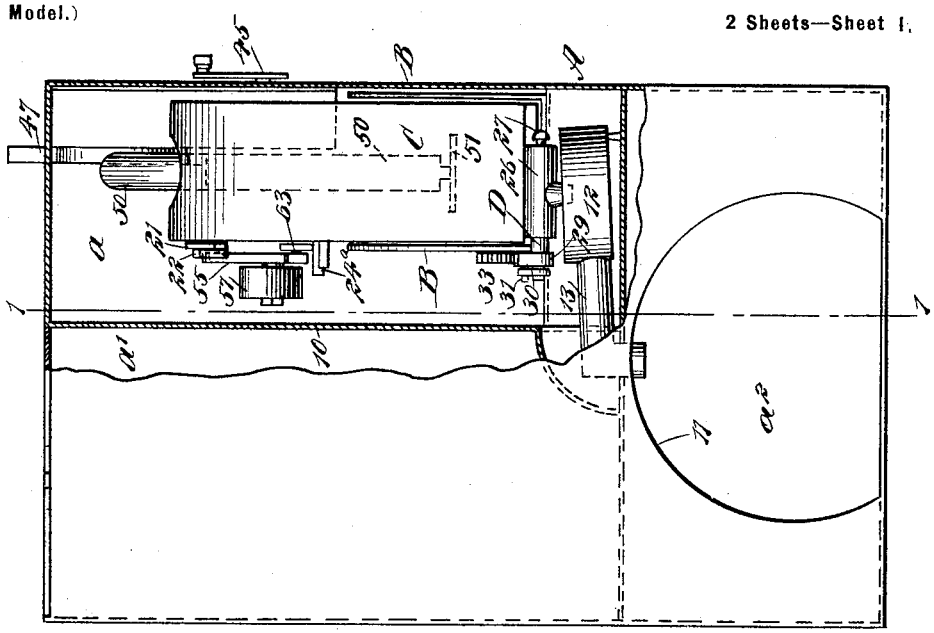
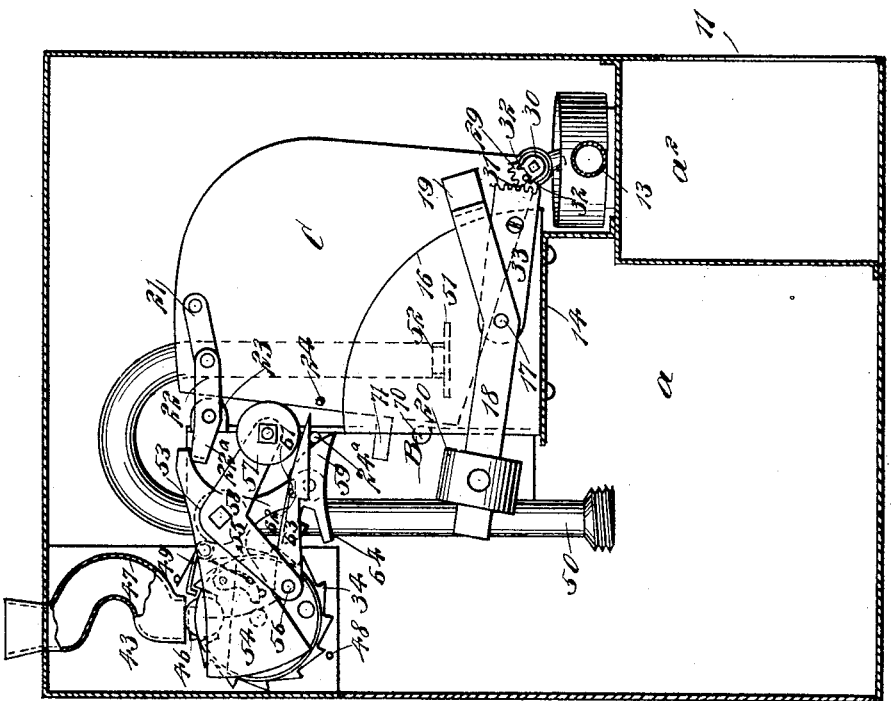
WITNESSES:
INVENTOR
Samuel P. Mackey.
BY
ATTORNEYS.

No. 639,074. Patented Dec. 12, 1899.
S. P. MACKEY.
WEIGHING AND MEASURING MACHINE.
(Application filed Oct. 8, 1898.)
(No Model.) 2 Sheets—Sheet 2.
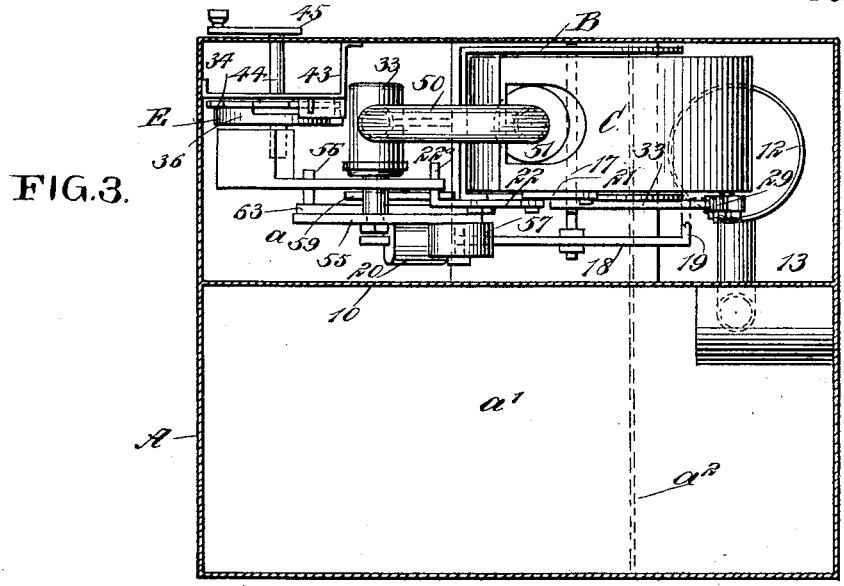
FIG. 3.
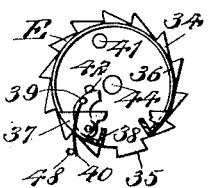
FIG. 8.
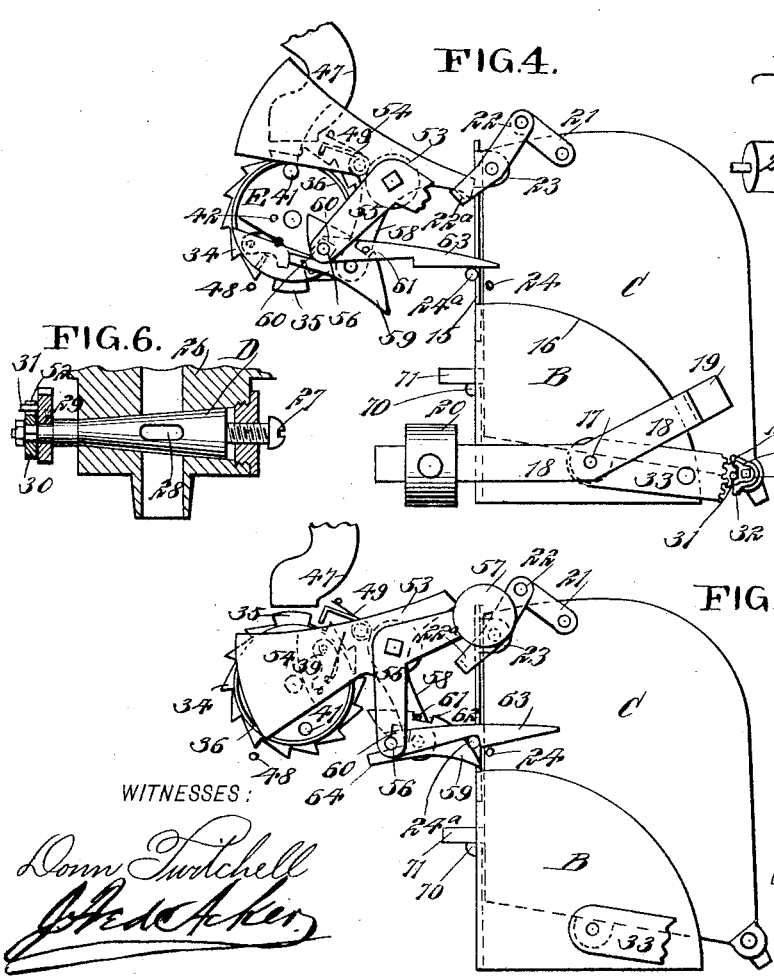
FIG. 4.
FIG. 6.
FIG. 7.
FIG. 5.
WITNESSES:
Donn Twitchell
Jo Fred Acker
INVENTOR
Samuel P. Mackey
BY
ATTORNEYS.

UNITED STATES PATENT OFFICE.

SAMUEL PAXTON MACKEY, OF RIDGEFIELD, WASHINGTON.

WEIGHING AND MEASURING MACHINE.

SPECIFICATION forming part of Letters Patent No. 639,074, dated December 12, 1899.

Application filed October 8, 1898. Serial No. 693,020. (No model.)

*To all whom it may concern:*

Be it known that I, SAMUEL PAXTON MACKEY, of Ridgefield, in the county of Clarke and State of Washington, have invented a new and Improved Weighing and Measuring Machine, of which the following is a full, clear, and exact description.

The purpose of this invention is to provide an apparatus for measuring and delivering a certain quantity of liquid, to which end the apparatus comprises a rocking tank having an outlet-valve actuated by the rocking movement of the tank and operating with certain mechanism for restoring the tank to upright position after the rocking thereof and for controlling the supply of liquid to the tank.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the machine, taken practically on the line 1 1 of Fig. 2, illustrating the receptacle and mechanism controlling the same in side elevation and the coin-chute in section, the mechanism for operating the receptacle being in initial position. Fig. 2 is a front elevation of the machine, parts being broken away to disclose the receptacle and connections, the balance-beam, however, being omitted. Fig. 3 is a horizontal section through the body of the machine, illustrating the weighing and measuring receptacle and connected parts in plan view. Fig. 4 is a side elevation of the weighing and measuring receptacle and connected parts, said receptacle and connected parts being in the second or intermediate position. Fig. 5 is a view similar to Fig. 4, illustrating the position that the parts assume just previous to the receptacle receiving its quota of liquid. Fig. 6 is a detail sectional view of the outlet-valve. Fig. 7 is a detail view of the coin-receiving wheel; and Fig. 8 is a detail view with parts in section, illustrating the receptacle and showing parts coacting therewith.

A represents a casing which may be of any desired shape; but as shown in the drawings the casing is of rectangular form, and such form is usually employed. The casing is provided with a partition 10, which separates it into two compartments $a$ and $a'$, the compartment $a$ being adapted to contain the mechanism and the compartment $a'$ the refrigerating material, if such material is to be employed. At the front lower portion of the casing A or body of the device a chamber $a^2$ is formed by means of a suitable vertical and horizontal partition, as shown particularly in Fig. 1, which chamber extends ordinarily from side to side of the body, and at the central portion of the front of the body an opening 11 is made, leading into the chamber $a^2$, in which chamber the receptacle is placed that is adapted to receive the liquid from the weighing and measuring device, the receptacle being introduced into the chamber through the aforesaid opening 11. Just above the chamber $a^2$, at the top, a pan or like device 12 is supported, which pan or other receptacle employed is provided with a spout 13, and said spout is preferably carried through the partition 10, as shown in Fig. 2, and downward through the upper wall of the chamber $a^2$.

A platform 14 is located within the compartment $a$, and the said platform is preferably supported upon the upper surface of the chamber $a^2$, as shown in Fig. 1. This platform 14 serves to support the casing B, as shown particularly in Figs. 1, 4, and 5, and consists of a back section 15 and side sections 16, which are usually curved at their upper edges and extend practically from the bottom portion of the casing B to a point near the center. The pivot 17 for the receptacle C is placed near the center of the balance of the said receptacle at the bottom and is journaled in the sides 16 of the casing B. At one end of the pivot 17 a balance-beam 18 is secured, the said balance-beam being preferably provided with an extension 19 at its forward end, which extension is directed inward, closely approaching the receptacle C, and serves, practically, as a guide therefor, (see Figs. 3 and 8,) while at the opposite end of the balance-beam a weight 20 is adjustably placed, through the medium of which the amount of liquid that is to be received in the receptacle C is regulated.

At the upper portion of the receptacle C, near the rear, a link 21 is pivotally attached, which link is connected with a second link 22, the second link 22 being adapted to extend beyond the rear portion of the casing B, and the rear section of the link 22 is provided with a stirrup 22ª. The stirrup-link 22 is pivoted upon a lip 23, which extends from the back of the casing near the top, as shown in Figs. 1, 4, and 5. A pin 24 is located upon the receptacle C just above the side 16 of its supporting-casing, at which the balance-beam 18 is located, as shown in Figs. 4 and 5, and adjacent to the pin 24 a stationary pin 24ª is located upon the back of the casing B and off the receptacle C, the pin 24ª being above the aforesaid pin 24, and the location of these two pins is distinctly shown in Figs. 4 and 5.

At the bottom front portion of the receptacle C an outlet-valve D is located in an extension 26 from the said casing, as shown in Fig. 6. This valve D consists of a key of tapering or conical shape, which is mounted to transversely turn in the aforesaid extension 26, being held in proper position by a retaining-screw 27. The plug or key of the valve D is provided at or near its center with an opening 28, which corresponds to the outlet-opening of the receptacle C, and at one end of the plug or key of the valve D, as is also shown in Fig. 6, a mutilated gear 29 is loosely mounted, and on the said plug or key of the valve, outside of the mutilated gear, a disk 30 is securely fastened, which disk is provided with extensions 32 at its upper edge, the said extensions being spaced a predetermined distance apart, as is shown particularly in Fig. 1, these extensions 32 being in the nature of horns. A pin 31 is attached to the mutilated gear 29, and this pin is made to enter the space between the horns 32 of the disk 30. Therefore when the mutilated gear is given a rocking motion the pin 31 will move in the said space between the horns 32 and will strike either one or the other of the horns, according to the direction in which the mutilated gear is given movement, and will open or close the aforesaid plug of the valve D. Such movement is communicated to the valve D by attaching a plate 33 to the casing B at one of its sides, the said plate, for which may be substituted a bar, being provided with teeth adapted to mesh with the teeth of the mutilated gear, as shown in Fig. 1.

The apparatus may be actuated by a coin-controlled mechanism E, such as a wheel which is provided with peripheral teeth 34 of a ratchet formation, the inclination of all the teeth being in the same direction; but at a point in the periphery of the said wheel the inclined teeth are interrupted and in their place a single tooth 35 is formed, as shown in Fig. 7, which tooth 35 is provided with a convexly-curved outer edge and inwardly-inclined edges. The coin-receiving wheel E is further provided with a flange 36, which is located near the margin of the wheel and at the base of the teeth thereof; but the said flange is interrupted at each side of the tooth 35 and at each end of the flange a partition 38 is produced, the partitions being made to converge at their inner ends, and the space between the partitions forms a pocket, which pocket is completed by a cross-bar 37. (Shown broken away in Fig. 7.)

A hammer 39 is pivotally attached to the cross-bar 37, the said hammer being provided with an attached spring 40, which extends beyond the teeth of the coin-receiving wheel, and the coin-receiving wheel is further provided with a stud or pin 41, located within the flange 36 at a point nearly opposite the tooth 35, and the wheel is further provided with a small pin or stud 42 at the same face, adapted to limit the outward movement of the hammer 39, as is also shown in Fig. 7.

The coin-receiving wheel is pivoted in a casing 43, located at the corner of the main casing A, the said coin-operating wheel being secured upon a spindle 44, which extends through the casing 43 to the rear face of the main casing A, as shown in Fig. 3, and at the outer or rear end of the spindle 44 a crank-arm 45 is secured in any suitable or approved manner, as is also best shown in Fig. 3.

The coin adapted to be received by the pocket of the wheel E is shown in its initial position in Fig. 1, having been delivered to the pocket of the said wheel through a chute 47, and the said chute is preferably curved between its ends, so as to prevent a wire or like object from being introduced into the chute to control the movement of the coin-receiving wheel. The inclined teeth 34 of the coin-receiving wheel are normally engaged by a spring-controlled pawl 49, and the said pawl permits the wheel to be turned in one direction only.

Liquid is introduced into the receptacle C through the medium of a pipe 50, which is adapted to receive a coil at its lower end, located in the refrigerating compartment of the main casing A and connected with a source of liquid-supply, and the said pipe or tube 50 is made to extend downward within the receptacle C in such manner as not to interfere with the rocking movement of the receptacle upon its pivot 17, as shown in Fig. 1. The end of the tube or pipe 50 that is located in the receptacle C is closed by a disk 51, and openings 52 are provided adjacent to the said disk, so that the liquid supplied to the receptacle C will not impinge on the bottom of the said receptacle, but will be spread out through the delivery-tube in such manner as not to exert influence upon the receptacle in a direction that would tend to cause the receptacle to have forward or rearward movement.

A valve 53 of any approved construction is located in the upper portion of the delivery tube or pipe 50, and upon the stem of the said valve an arm 54 is loosely fulcrumed, the rear end of the arm being heavier than its forward end, and the forward end of the arm 54 is adapted to enter the stirrup-section 22ª of the links 21 and 22, connected with the said receptacle, the said links being adapted to limit the movement of the receptacle C either in dumping or when carried to a receiving position.

An angle arm or lever 55 is securely fastened to the stem of the valve 53 at that end at which the weighted arm 54 is located, and the angle arm or lever 55 at its rear extremity is provided with a pin 56, while a weight 57 is attached to its opposite end, as shown in Figs. 1, 4, and 5.

The weighted arm 54 is provided with a shank or extension 58, and upon the said shank or extension a pawl 59 is pivoted, having its upper forward surface curved, and the said pawl is, furthermore, provided with a recess 60 in its under face, the movement of the pawl being limited by a pin 61, adapted to travel in an opening 62 in the upper portion of said pawl, as shown in Figs. 4 and 5. The recess in the lower portion of the pawl 59 is adapted to receive the pin 56, attached to the angle arm or lever 55, as shown in Fig. 4, and the pawl is adapted to be disengaged from the said pin 56 when the upper forward edge of the said pawl engages with the pin or stud 24ª on the casing B of the receptacle C.

A second pawl 63 is pivotally attached to the rear lower end portion of the angle lever or arm 55, and the said pawl 63, which is in the nature of a latch, is provided with a head that is adapted to hook upon the pin or stud 24ª, attached to the casing B, as shown in Fig. 5, and when the receptacle C is carried to a tilting position the latch-pawl 63 is carried upward and away from the pin or stud 24, attached to said receptacle, engaging with the under surface of the head of the lock or latch-pawl. The pawl 59 is provided with a guide-section 64 at its lower rear or free end, said guide 64 serving to prevent the pawl 59 from being carried out of operative engagement with the angle-arm 55.

The parts having been properly assembled, the coin-receiving wheel and regulating mechanism being shown in position in Fig. 1, whenever a coin of proper denomination is dropped into the chute 47 the coin will be directed into the pocket of the coin-receiving wheel E, as shown in Fig. 1. When the coin reaches such a position by turning the crank-arm 45, the coin will cause the spring-pawl 49 to rise over and beyond the tooth 35 and engage with the other regularly-inclined teeth 34. At the same time that the coin-receiving wheel is rotated the pin or stud 41 of the said wheel will raise the weighted arm 54 to the position shown in Fig. 4, causing the forward end of the arm 54 to extend downwardly and rearwardly in direction of the stirrup portion of the link 22, causing the two links 21 and 22 to assume a more or less acute angular position and likewise causing the receptacle C to be restored to a vertical position. The moment that the weighted arm 54 is released from the stud 41 the arm at its weighted end will drop downward, and as the pawl 59, attached to the shank 58 of said weighted arm, is at this time in engagement with the pin 56 of the angle-lever 55 such lever at its rear end will be carried forwardly, and thus open the valve 53 and permit liquid to be introduced into the receptacle C. At this stage in the operation of the device the latch-pawl 63 will be carried to an engagement with the stud or pin 24ª, while at the same time the said pin or stud 24ª will press the lower end of the locking-pawl 59 downward, releasing the angle-arm 55 from said pawl, as shown in Fig. 5. The liquid will now run freely into the receptacle C, and when the proper quantity of liquid has been received by said receptacle it will incline forwardly, especially at its upper end, and when the receptacle has received all the material to be delivered thereto said receptacle C will drop in a downwardly and forwardly direction, causing the pin or stud 24 to raise or elevate the latch-pawl 63, and the downward movement of the receptacle also operates the lower valve and permits the liquid to escape therefrom into a vessel placed to receive it.

The outlet-valve, as above stated, is opened by the action of the measuring and weighing receptacle C dropping to a forward position.

In order to check the receptacle and prevent it from dropping violently back when set to receive liquid, a cushion of any kind may be provided—as, for example, a hollow ball 70, having an air-vent therein, may be secured to the casing B to be engaged by an arm 71, projected from the receptacle, as shown in Figs. 4 and 5, and like provision may be made for the scale-beam 18.

Having thus described my invention, I claim as new and desire to secure by Letters Patent—

1. The combination of a tilting liquid-receptacle, a valve commanding the outlet thereof, a gear-wheel mounted loosely on the stem of the valve, a disk fast to the stem of the valve and having two horns, a pin attached to the gear-wheel and bearing between the horns, to turn the disk and operate the valve, and a toothed plate engaging the gear-wheel and held stationary off the receptacle.

2. The combination of a tilting liquid-receptacle, a pipe supplying the liquid thereto, a valve commanding the pipe, an angle-arm in connection with the valve to actuate the same, a weight attached to one end of the angle-arm, a pawl carried on the other end thereof, a stationary pin engaged by the pawl and adapted to lock the same, a pin carried on the liquid-receptacle and adapted to engage the pawl, to release the same from the stationary pin, a swinging arm, means for actuating the arm, a pawl carried by the swinging arm and adapted to periodically engage the angle-arm, to move the same, and means in connection with the receptacle engaged by the said swinging arm, to move the receptacle.

3. The combination of a tilting receptacle, a valve commanding the feed thereto, an arm connected with the valve to operate the same, a pawl connected with the arm, a stationary element engaged by the pawl to hold the arm, a pin carried on the receptacle and engaging the pawl, to trip the same and release the arm, a swinging arm, a pawl carried thereby and adapted to engage the arm of the valve to move the valve-arm, and means actuated by the swinging arm for returning the tilting receptacle.

4. The combination of a swinging arm, means for operating the arm, a tilting receptacle, a connection between the arm and the receptacle to return the receptacle, a valve commanding the feed to the receptacle, an arm in connection with the valve to operate the same, a pawl carried by the swinging arm and adapted to engage the valve-arm, to throw the valve-arm, a pawl in connection with the valve-arm, a stationary member engaged by the pawl to hold the valve-arm, and a pin carried by the receptacle and engaging the pawl of the valve-arm, to trip the same.

5. The combination of a tilting receptacle, a swinging arm, means for operating the same, a connection between the swinging arm and the receptacle to return the receptacle, a valve commanding the feed to the receptacle, an arm in connection with the valve to move the same, a pawl carried by the swinging arm and engaging the valve-arm to move the valve-arm, a pawl carried by the valve-arm, and a stationary member with which the pawl of the valve-arm engages to hold the valve-arm, the pawl of the valve-arm being tripped by the movement of the receptacle.

6. The combination with a stationary support, of a tilting receptacle, a swinging arm, a link pivoted on the support and adapted to be engaged by the swinging arm, a link connected with the first link and with the receptacle, by which links to return the receptacle, a valve commanding the inlet to the receptacle, an arm in connection with the valve, a pawl carried by the swinging arm and adapted to engage the valve-arm, to move the latter, and a pawl carried by the valve-arm and adapted to engage a part of the support, to hold the valve-arm, the pawl of the valve-arm being tripped by the movement of the receptacle.

7. The combination with a support, of a swinging arm, means for operating the swinging arm, a tilting receptable, a connection between the swinging arm and the tilting receptacle, to restore the tilting receptacle, a valve commanding the inlet to the tilting receptacle, an arm in connection with the valve, a pawl carried by the swinging arm and engaging the valve-arm to move the valve-arm, and a pawl carried by the valve-arm and adapted to lock with a part of the support to hold the valve, the pawl being tripped by the movement of the receptacle.

8. The combination of a tilting receptacle, a swinging arm, means for operating the same, a connection between the swinging arm and the receptacle to return the receptacle, a valve commanding the inlet to the receptacle, a pawl carried by the swinging arm and adapted to engage the valve-arm, to move the same, and means for holding the valve-arm, such means being releasable by the movement of the receptacle.

9. The combination of a tilting receptacle, a valve commanding the same, and gearing for operating the valve, one part of the gearing being in connection with the valve and the other part of the gearing being mounted stationary with reference to the receptacle.

10. The combination with a support, of a tilting receptacle, a valve controlling the inlet thereto, an arm in connection with the valve and adapted to have connection with the support to hold the valve in open position, a weighted arm having connection with the receptacle to return the receptacle, and a connection between the weighted arm and the arm of the valve, to throw the valve to open position.

SAMUEL PAXTON MACKEY.

Witnesses:
A. H. WITHINGTON,
WALLACE McCAMANT.